(12) United States Patent
Yen et al.

(10) Patent No.: US 7,936,884 B2
(45) Date of Patent: May 3, 2011

(54) REPLAY DEVICE AND METHOD WITH AUTOMATIC SENTENCE SEGMENTATION

(75) Inventors: Jui Yu Yen, Kaohsiung (TW); Ming Hsiang Yen, Kaohsiung (TW); Yi Chin Lin, Fongshan (TW)

(73) Assignee: Micro-Star International Co., Ltd., Jung-He (TW)

( * ) Notice: Subject to any disclaimer, the term of this patent is extended or adjusted under 35 U.S.C. 154(b) by 1105 days.

(21) Appl. No.: 11/676,219

(22) Filed: Feb. 16, 2007

(65) Prior Publication Data

US 2008/0140237 A1 Jun. 12, 2008

(30) Foreign Application Priority Data

Dec. 8, 2006 (TW) .............................. 95145972 U

(51) Int. Cl.
*H04R 29/00* (2006.01)
(52) U.S. Cl. ............... 381/56; 700/94; 463/35
(58) Field of Classification Search ............ 381/56, 381/58, 119, 110; 700/94; 463/35; 84/604, 84/609; 704/207, 208, 210, 214–217, 270–272
See application file for complete search history.

(56) References Cited

U.S. PATENT DOCUMENTS

| | | | | |
|---|---|---|---|---|
| 5,231,239 A * | 7/1993 | Tsumura et al. | ................ | 84/609 |
| 5,827,988 A * | 10/1998 | Wachi | .............. | 84/609 |
| 6,316,710 B1 * | 11/2001 | Lindemann | .................... | 84/609 |
| 6,678,661 B1 * | 1/2004 | Smith et al. | ................... | 704/278 |
| 7,050,590 B2 * | 5/2006 | McPherson et al. | ........... | 381/56 |
| 7,187,290 B2 * | 3/2007 | Hyde et al. | ................. | 340/572.1 |
| 7,668,434 B2 * | 2/2010 | Mitsuyu | ....................... | 386/219 |
| 2004/0114475 A1 * | 6/2004 | Suzuki et al. | .............. | 369/30.08 |
| 2008/0140391 A1 * | 6/2008 | Yen et al. | ...................... | 704/200 |
| 2010/0011293 A1 * | 1/2010 | Yang et al. | ................... | 715/716 |

FOREIGN PATENT DOCUMENTS

TW I255412 5/2006

* cited by examiner

*Primary Examiner* — Xu Mei
(74) *Attorney, Agent, or Firm* — Apex Juris, pllc; Tracy M Hiems

(57) ABSTRACT

A replay device and method thereof with automatic sentence segmentation is provided. A soundwave analysis module receives a soundwave signal and analyzes the soundwave signal to determine plural segmentation points. A replay actuation module receives a replay command and sets a replay endpoint on the soundwave signal. A replay access module sets the nearest segmentation point prior to the replay endpoint as a replay startpoint. A replay module plays the soundwave signal from the replay startpoint to the replay endpoint.

14 Claims, 4 Drawing Sheets

REPLAY DEVICE AND METHOD WITH AUTOMATIC SENTENCE SEGMENTATION

CROSS-REFERENCES TO RELATED APPLICATIONS

This non-provisional application claims priority under 35 U.S.C. §119(a) on Patent Application No(s). 95145972 filed in Taiwan, R.O.C. on 2006 Dec. 8, the entire contents of which are hereby incorporated by reference.

BACKGROUND OF THE INVENTION

1. Field of Invention

The present invention relates to a replay device and method, and more particularly to a replay device and method with automatic sentence segmentation function.

2. Related Art

Language learning apparatus or music player device currently has "REPLAY" function. It facilitates user's repeated listening when learning a language or interested in some section of music, thereby not wasting time on backward operations.

A device with general voice-replaying function is only capable of manually setting time points A and B as a replay period and replay repeatedly. Or, setting the time point A (replay startpoint) first, the device with general voice-replaying function will automatically calculate a delayed time period as the time point B (replay endpoint).

However, for user's actual operating situation, when certain sentence or music section is unclear or user intends to listen again, usually user already missed the desired time point A. Then the backward operation needs to be applied to search for the expected time point A and set as replay startpoint. Furthermore, as a result of user's various responding speeds, the set time point A is different from the expected time point of user and causes usage inconveniences.

Presently a player device is already provided with an automatically setting function of replay start-address (point A); the user does not have to set it manually. The method is to set the current time point as the replay endpoint B when the user actuates the replay function, and then trace a certain time period (such as 10 seconds) backwards to set as the replay startpoint. However, although such method no longer needs the user's manual setting operation for the replay startpoint, the replay time period is limited to a certain time period backwards. Besides, when the voice is playing, it is possible that the first sentence lasts for only 5 seconds and the second sentence lasts for 10 seconds. The playing time period has to be decided according to the length of the sentence, which is not a fixed and certain time. Therefore, by means of tracing the certain time period backwards to set as the replay startpoint, the device actually cannot reach the replay startpoint as the user's expectation, nor reach the beginning of the sentence for the user to listen a complete sentence repeatedly.

Consequently, how to make the player device with voice-replay function automatically set a correct replay startpoint without the user's manual operation and allow the user listening a complete sentence repeatedly, has become a problem in urgent need of solution.

SUMMARY OF THE INVENTION

Accordingly, the present invention provides a replay device and method with automatic sentence segmentation, which capable of automatically analyzing the segmentation points of a soundwave signal. When the replay function is actuated, trace backward to find the nearest segmentation point and set as the replay startpoint. Since the soundwave signal has been through the analysis of sentence segmentation in advance and all the set replay startpoints are segmentation points, what the user hears while replaying will always be starting from the beginning of each sentence; which helps the user to listen complete sentences.

A replay device with automatic sentence segmentation provided in an embodiment of the present invention includes: a soundwave analysis module, a replay actuation module, a replay access module and a replay module.

The soundwave analysis module receives the soundwave signal and analyzes the soundwave signal to determine plural segmentation points. To determine the segmentation point there may be three methods: First, analyze the soundwave energy of the soundwave signal; second, use spectrum analysis; and third, apply voice identification.

The replay actuation module receives a replay command and set a replay endpoint on the soundwave signal. When receiving the replay command, there are three ways to set the replay endpoint on the soundwave signal: first, set the time point corresponding to the soundwave signal of receiving the replay command as the replay endpoint; second, at the time point of receiving the replay command, trace backwards on the soundwave signal to find the end point of the last segmented sentence and set as the replay endpoint; third, when receiving the replay command, trace forwards on the soundwave signal to find the end point of the current segmented sentence with the replay command received and set as the replay endpoint.

The replay access module sets the nearest segmentation point prior to the replay endpoint as the replay startpoint. The replay module plays the soundwave signal from the replay startpoint set by the replay access module, to the replay endpoint set by the replay actuation module.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 1:
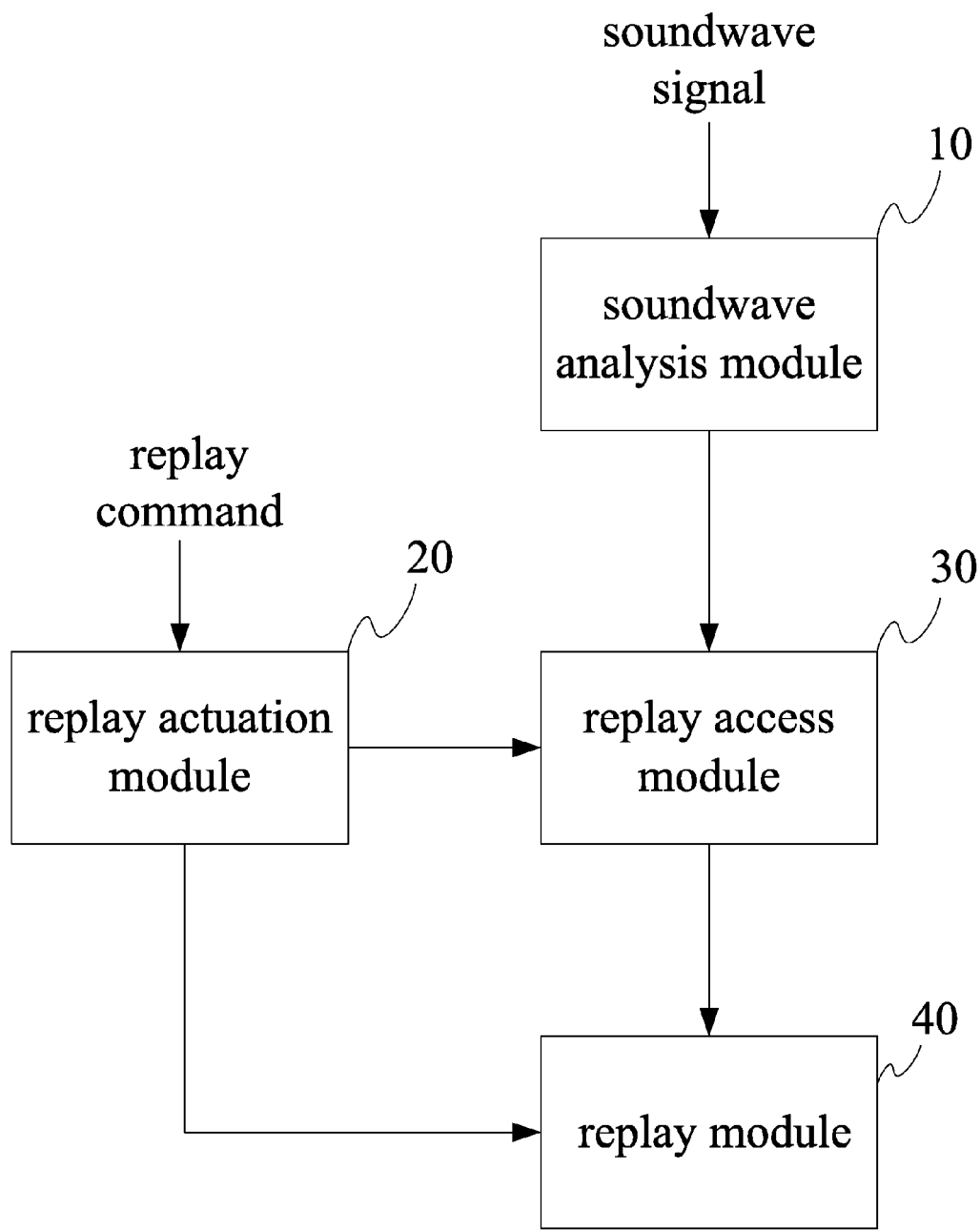
FIG. 1 is an explanatory diagram for a replay device with automatic sentence segmentation according to an embodiment of the present invention.

Please refer to FIG. 1, which shows an explanatory diagram for a replay device with automatic sentence segmentation. The replay device with automatic sentence segmentation includes: a soundwave analysis module 10, a replay actuation module 20, a replay access module 30 and a replay module 40.

The soundwave analysis module 10 receives the soundwave signal; the soundwave signal may be voice declamation such as English conversation for a user to learn listening. In the other hand, when the user is listening to the voice declamation, sometimes there exits background sound within. For example, when listening to Japanese conversation, there might be gentle orchestral music accompanying within as the background sound. Therefore, the soundwave signal may be the voice declamation plus the background sound.

After the soundwave analysis module 10 receives the soundwave signal, it analyzes the soundwave signal to determine plural segmentation points. Since the voice declamation is played sentence by sentence and between each sentence is so-called sentence segmentation, declaiming an article or playing a section of voice will generate plural segmentation points. To determine the segmentation points for every sentence may allow the user to trace backwards to the start point of every voice sentence when listening the playing of the soundwave signal and intending to replay and listen again. Therefore, to ensure the user to actuate a replay function may trace backwards to the start point of the last sentence or any of the former sentences and restart to listen.

The soundwave analysis module 10 keeps determining the segmentation point(s) when the soundwave signal is played normally. Accordingly, the user may listen to the normal playing of the soundwave signal, and the soundwave analysis module 10 of the present invention analyzes the segmentation point(s) at the same time.

For the soundwave analysis module 10, analyzing the soundwave signal and determine plural segmentation points may be achieved through the following three methods. The first method is to analyze the soundwave energy of the soundwave signal. The segmentation point will be determined when the soundwave energy of the soundwave signal is lower than an average value. When playing a section of the soundwave signal, the soundwave energy has highs and lows. From the user's aspect, that sounds like so-called special cadence in voice. Briefly, the voices thereof will have differences between loud and soft, or high and low. For voice declamation, after ends a sentence and before starts the next, there is a short mute period or the soundwave energy decreases, which is so-called the segmentation point. The first method is to use such characteristic. First we set an average value for the soundwave energy, when playing the soundwave signal, the segmentation point may be determined as long as the soundwave energy is lower than the average value.

The second method is that, the soundwave analysis module 10 uses spectrum analysis to differentiate the soundwave signal between voice declamation and background music, and determine the segmentation point of the voice declamation. As mentioned above, sometimes the soundwave signal has the voice declamation and the background music exiting at the same time. Since there are different spectrum between the voice declamation and the background music, the soundwave analysis module 10 may uses spectrum analysis to differentiate between the voice declamation and the background music. Then, use the first method or other methods to determine the segmentation point on the differentiated voice declamation.

The third method is that the soundwave analysis module 10 uses voice identification to determine the segmentation point. The objective of voice identification is to enable electrical apparatuses to acknowledge human voices to perform corresponding tasks. When the testing voice is transferred from analog to digital and then input and stored digitally, the voice identification program will use a voice sample stored in advance to compare with the input testing voice sample. Therefore, through voice identification every sentence in the soundwave signal can be identified to determine the segmentation point(s) of every sentence.

The replay actuation module 20 receives the replay command and determines the replay endpoint on the soundwave signal. The replay command is given by the user. When the user is listening to the soundwave signal, the replay command may be given at any time to notify the replay device in the present invention of the replay operation. When the replay actuation module 20 receives the replay command, there are three approaches to determine the replay endpoint on the soundwave signal. The first approach is that, the replay endpoint is set as the time point on the soundwave signal when the user gives the replay command. Therefore, when the replay actuation module 20 receives the replay command, the replay endpoint will be set on the soundwave signal received by the soundwave analysis module 10 and set as the time point of receiving the replay command.

The second approach is to trace backwards on the soundwave signal to find the end point of the last segmented sentence and set as the replay endpoint when the replay actuation module 20 receives the replay command. Accordingly, the user is allowed listening to complete sentence(s) when actuating the replay function to play again.

The third method is to trace forwards on the soundwave signal to find the end point of the current segmented sentence at the time point of receiving the replay command and set as the replay endpoint when the replay actuation module 20 receives the replay command. Such approach enables the user to listen to complete sentence(s) as well when actuating the replay function to play again. The differences from the former approach described above is that the second approach traces "backwards" on the soundwave signal to find the "last" segmented sentence, but the third approach traces "forwards" on the soundwave signal to find the end point of the "current" segmented sentence; wherein the above three setting approaches for the replay endpoint may be selectable by demand for the user.

The replay access module 30 sets the nearest segmentation point prior to the replay endpoint as the replay startpoint. According to the replay endpoint set by the replay actuation module 20, the replay access module 30 traces backwards to find the nearest segmentation point prior to the replay endpoint and set as the replay startpoint. If the user continuously gives the replay commands for multiple times, that means the user intends to trace backwards to the former and former segmentation point. So when the replay actuation module 20 receives the replay commands for multiple times, the replay access module 30 will reset the one before the last segmentation point as the replay startpoint. Consequently, even the former one before the last segmentation point that the replay access module 30 automatically traces backwards is not what the user wants, the replay command may still be given repeatedly for multiple times to reach the desired replay startpoint.

Eventually, the replay module 40 plays the soundwave signal from the replay startpoint set by the replay access module 30 to the replay endpoint set by the replay actuation module 20. The time that the replay module 40 plays the soundwave signal from the replay startpoint to the replay endpoint may be one time or multiple times, which may be selectable by demand for the user.

Figure 2:
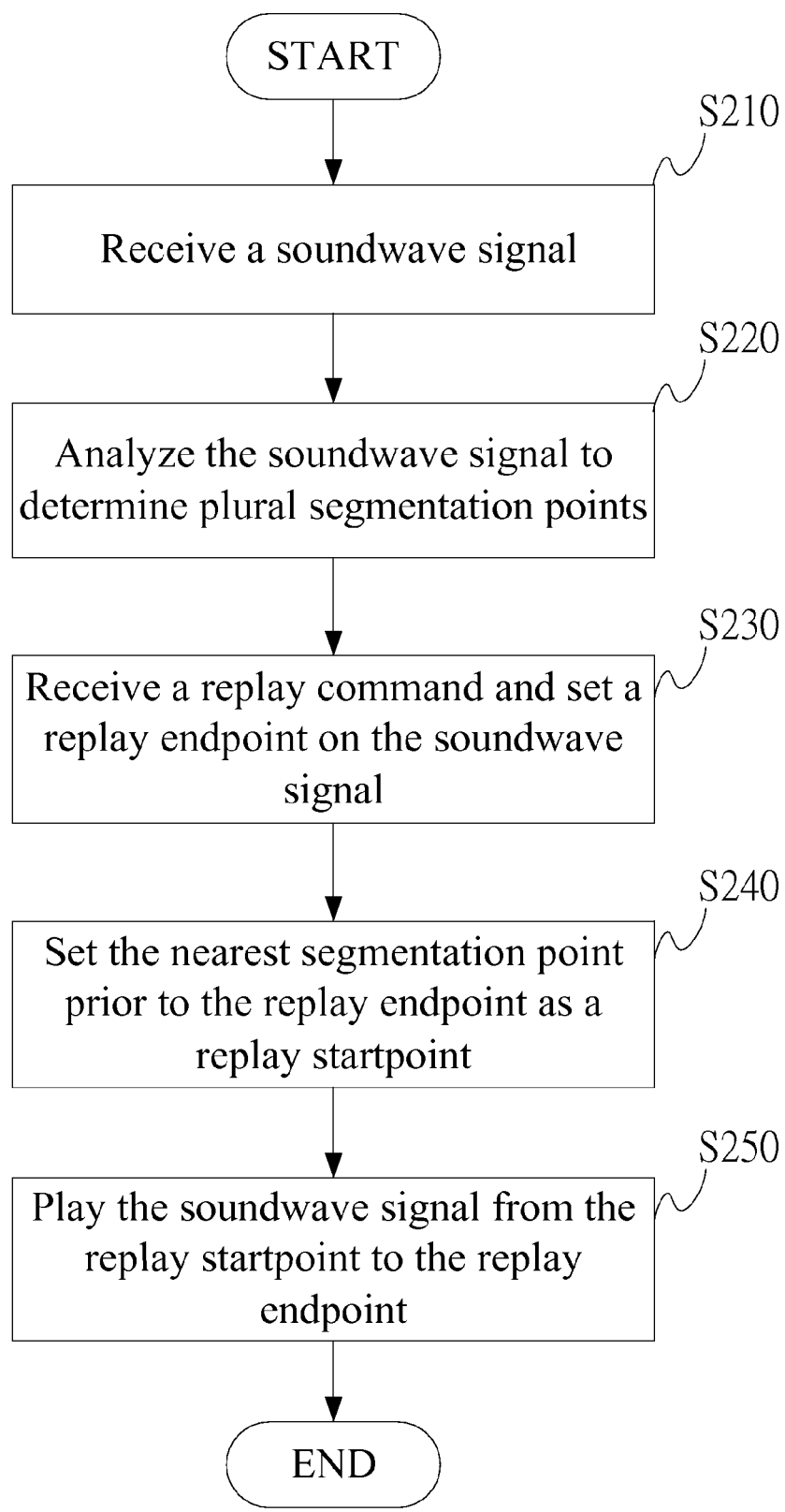
FIG. 2 is a flow chart for a replay method with automatic sentence segmentation according to an embodiment of the present invention.

Please refer to FIG. 2, which shows a flow chart for a replay method with automatic sentence segmentation according to an embodiment of the present invention. The replay method includes the following steps:

Step S210: Receive a soundwave signal; which may be the voice declamation only, or the voice declamation plus the background music.

Step S220: Analyze the soundwave signal to determine plural segmentation points. Analyzing to determine the segmentation point may be achieved through the following three methods. The first method is to analyze the soundwave energy of the soundwave signal. The segmentation point will be determined when the soundwave energy of the soundwave signal is lower than an average value. The second method is to use spectrum analysis to differentiate the soundwave signal between voice declamation and background music, and determine the segmentation point of the voice declamation. The third method is to use voice identification to determine the segmentation point.

Step S230: Receive a replay command and set a replay endpoint on the soundwave signal. When the user is listening to the soundwave signal, the replay command may be given at any time. When the replay command is received, there are three approaches to determine the replay endpoint on the soundwave signal: first, the replay endpoint is set as the time point on the soundwave signal when the user gives the replay command; second, trace backwards on the soundwave signal to find the end point of the last segmented sentence and set as the replay endpoint when receiving the replay command; third, trace forwards on the soundwave signal to find the end point of the current segmented sentence at the time point of receiving the replay command and set as the replay endpoint.

Step S240: Set the nearest segmentation point prior to the replay endpoint as a replay startpoint. According to the replay endpoint set by step S230, step S240 traces backwards to find the nearest segmentation point prior to the replay endpoint as the replay startpoint.

Figure 3:
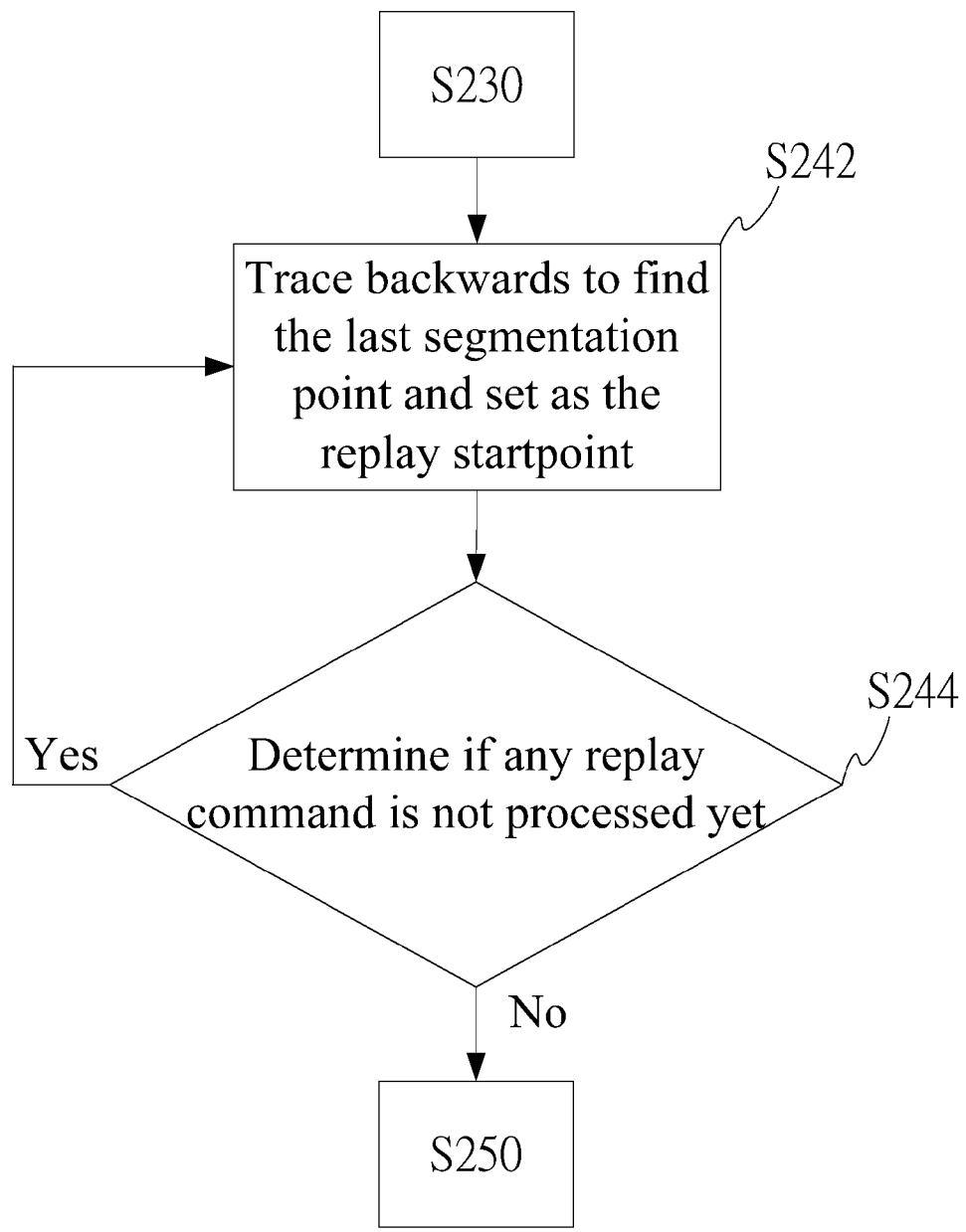
FIG. 3 is a detailed flow chart for setting a replay startpoint according to an embodiment of the present invention.

Step S250: Play the soundwave signal from the replay startpoint set by step S240 to the replay endpoint set by step S230. Please refer to FIG. 3, which shows a detailed flow chart for setting a replay startpoint according to an embodiment of the present invention. Step S240 is the step for setting the replay startpoint, which may be subdivided to the following steps:

Step S242: Trace backwards to find the last segmentation point and set as the replay startpoint.

Step S244: Determine if any replay command is not processed yet. If there is any replay command not processed yet, go back to step S242. If there is no replay command not processed, go to step S250.

In step S230, if the replay command is continuously received for multiple times, first trace backwards from the replay endpoint to find the last segmentation point through step S242 and set as the replay startpoint. Next, step S244 will determines if there is any replay command not processed yet. Since the replay command is received for multiple times, go to step S242 and trace backwards from the previously set replay startpoint to another former segmentation point. Then, the one before the last segmentation point will be reset as the replay startpoint, until the replay command(s) is processed. Therefore, if the user wants to return to the $N^{th}$ segmentation point prior to the replay endpoint, simply gives the replay command for N times. Then, the replay startpoint will be set as any desired segmentation point.

Accordingly, even though in the beginning the last segmentation point that step S242 automatically traces back is not the desired replay startpoint, the user may return to the one before the last segmentation point by repeatedly giving the replay command one more time. By means of giving the replay command for multiple times, the user may actually return to the desired one of replay startpoint.

Figure 4:
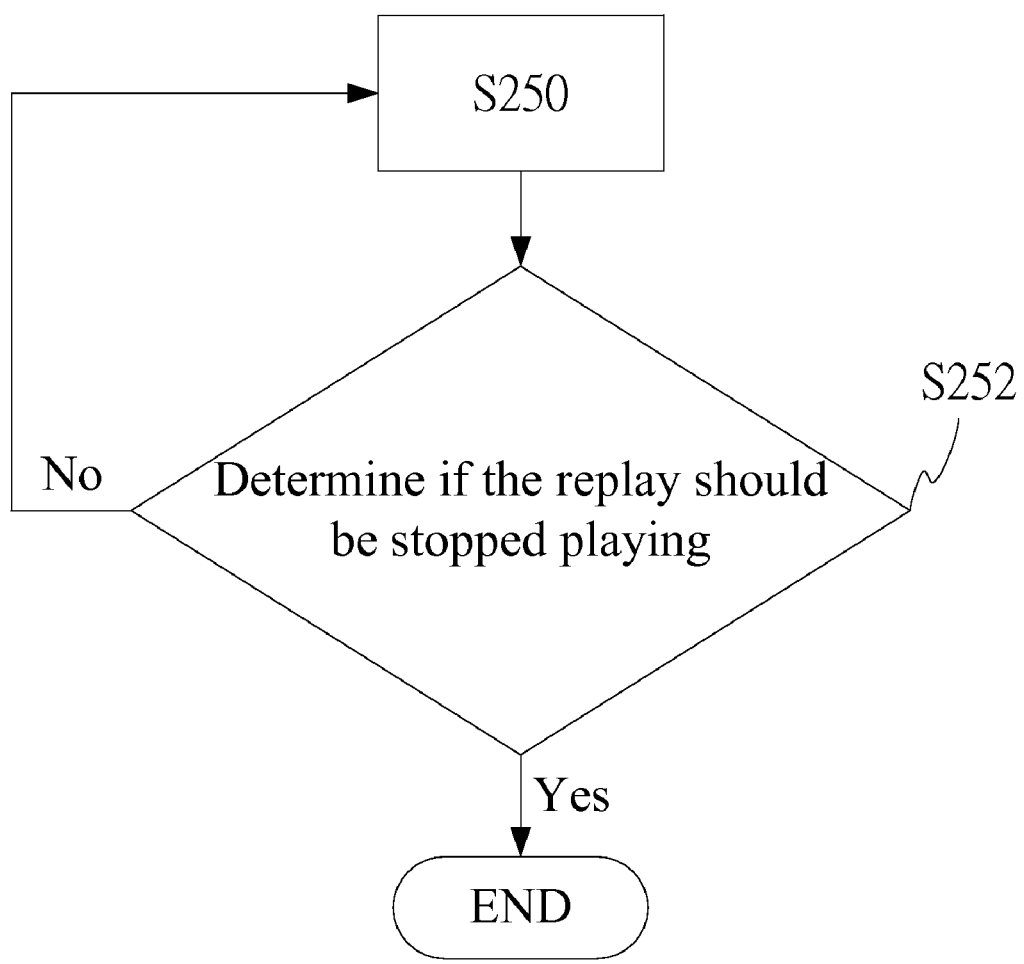
FIG. 4 is a detailed flow chart for playing a replayed soundwave signal according to an embodiment of the present invention.

Please refer to FIG. 4, which shows a detailed flow chart for playing a replayed soundwave signal according to an embodiment of the present invention. Step S250 is the step for playing the replayed soundwave signal, which may include the following steps:

Step S252: Determine if the replay should be stopped playing. If "No", go back to step S250 and keep playing the soundwave signal from the replay startpoint to the replay endpoint. If "Yes", go to "End".

When the user feels like the replayed soundwave signal has been played for enough times, just stop the replay may stop playing the soundwave signal from the replay startpoint to the replay endpoint. Therefore, the time for playing the soundwave signal from the replay startpoint to the replay endpoint may be one time or multiple times, which is selectable by demand for the user.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A replay device with automatic sentence segmentation, comprising:
    a soundwave analysis module, receiving a soundwave signal and analyzing the soundwave signal to determine a plurality of segmentation points;
    a replay actuation module, receiving a replay command and setting a replay endpoint on the soundwave signal;
    a replay access module, setting a nearest segmentation point prior to the replay endpoint as a replay startpoint; and
    a replay module, playing the soundwave signal from the replay startpoint to the replay endpoint.

2. The replay device of claim 1, wherein the soundwave analysis module analyzes the soundwave energy of the soundwave signal, the segmentation point being determined when the soundwave energy of the soundwave signal is lower than an average value.

3. The replay device of claim 1, wherein the soundwave analysis module uses spectrum analysis to differentiate the soundwave signal between a voice declamation and a background music and determine the segmentation point of the voice declamation.

4. The replay device of claim 1, wherein the soundwave analysis module uses voice identification to determine the segmentation point.

5. The replay device of claim 1, wherein the replay access module resets the one before the last segmentation point as the replay startpoint when the replay actuation module continuously receives the replay command for multiple times.

6. The replay device of claim 1, wherein the time that the replay module plays the soundwave signal from the replay startpoint to the replay endpoint is one time.

7. The replay device of claim 1, wherein the time that the replay module plays the soundwave signal from the replay startpoint to the replay endpoint is multiple times.

8. A replay method with automatic sentence segmentation, comprising the steps of:
    receiving a soundwave signal;
    analyzing the soundwave signal to determine a plurality of segmentation points;

receiving a replay command and setting a replay endpoint on the soundwave signal;

setting a nearest segmentation point prior to the replay endpoint as a replay startpoint; and playing the soundwave signal from the replay startpoint to the replay endpoint.

9. The method of claim 8, wherein the analyzing step analyzes the soundwave energy of the soundwave signal, the segmentation point being determined when the soundwave energy of the soundwave signal is lower than an average value.

10. The method of claim 8, wherein the analyzing step uses spectrum analysis to differentiate the soundwave signal between a voice declamation and a background music and determine the segmentation point of the voice declamation.

11. The method of claim 8, wherein the analyzing step uses voice identification to determine the segmentation point.

12. The method of claim 8, wherein the one before the last segmentation point is reset as the replay startpoint when the replay command is continuously received for multiple times.

13. The method of claim 8, wherein the playing step plays the soundwave signal from the replay startpoint to the replay endpoint for one time.

14. The method of claim 8, wherein the playing step plays the soundwave signal from the replay startpoint to the replay endpoint for multiple times.

* * * * *